(12) United States Patent
Du et al.

(10) Patent No.: US 11,392,094 B2
(45) Date of Patent: Jul. 19, 2022

(54) STEADY STATE AND TRANSITION STATE MULTI-VARIABLE CONTROL METHOD OF A TURBOFAN ENGINE BASED ON AN ACTIVE DISTURBANCE REJECTION CONTROL THEORY (ADRC)

(71) Applicant: Dalian University of Technology, Dalian (CN)

(72) Inventors: Xian Du, Dalian (CN); Yanhua Ma, Dalian (CN); Ximing Sun, Dalian (CN)

(73) Assignee: DALIAN UNIVERSITY OF TECHNOLOGY, Dalian (CN)

( * ) Notice: Subject to any disclaimer, the term of this patent is extended or adjusted under 35 U.S.C. 154(b) by 605 days.

(21) Appl. No.: 16/462,521

(22) PCT Filed: Dec. 11, 2018

(86) PCT No.: PCT/CN2018/120254
§ 371 (c)(1),
(2) Date: May 20, 2019

(87) PCT Pub. No.: WO2020/118513
PCT Pub. Date: Jun. 18, 2020

(65) Prior Publication Data
US 2020/0183342 A1   Jun. 11, 2020

(51) Int. Cl.
*G05B 13/04*   (2006.01)
(52) U.S. Cl.
CPC .................................. *G05B 13/041* (2013.01)
(58) Field of Classification Search
CPC ..... G05B 13/041; F02K 3/04; F05D 2270/44; F05D 2270/704

USPC .......................................................... 700/29
See application file for complete search history.

(56) References Cited

U.S. PATENT DOCUMENTS

| | | | |
|---|---|---|---|
| 2009/0005886 A1 | 1/2009 | Gao et al. | |
| 2014/0195013 A1* | 7/2014 | Gao | G06F 17/10 |
| | | | 700/45 |

FOREIGN PATENT DOCUMENTS

| | | |
|---|---|---|
| CN | 103267644 A | 8/2013 |
| CN | 103942357 A | 7/2014 |
| CN | 104462653 A | 3/2015 |
| CN | 106886151 A | 6/2017 |
| CN | 107239634 A | 10/2017 |
| CN | 108762089 A | 11/2018 |
| EP | 1926001 A2 | 5/2008 |

* cited by examiner

*Primary Examiner* — Jigneshkumar G Patel
(74) *Attorney, Agent, or Firm* — Muncy, Geissler, Olds & Lowe, PC

(57) ABSTRACT

A steady state and transition state multi-variable control method of a turbofan engine based on an active disturbance rejection control theory (ADRC) belongs to the technical field of aero-engine control. Firstly, multiple groups of manipulated variables and controlled variables of a turbofan engine are preliminarily selected, and then the manipulated variables and controlled variables with high correlation are further determined by a correlation analysis method. Each group of control instructions is planned as a tracking trajectory by using a tracking differentiator, and is used as the input of a nonlinear proportional-differential controller together with the current state estimated by the extended state observer to calculate the manipulated variables.

1 Claim, 12 Drawing Sheets

STEADY STATE AND TRANSITION STATE MULTI-VARIABLE CONTROL METHOD OF A TURBOFAN ENGINE BASED ON AN ACTIVE DISTURBANCE REJECTION CONTROL THEORY (ADRC)

TECHNICAL FIELD

The present invention relates to a steady state and transition state multi-variable control method of a turbofan engine based on an active disturbance rejection control theory (ADRC), in particular to establishing a multi-variable control framework of an aero-engine to optimize the control effect of the turbofan engine in the process of operating at idle and above speeds based on the ADRC, belonging to the technical field of aero-engine control.

BACKGROUND

The present invention replies on the background of the control technology of a certain type of twin-spool turbofan engine. At present, the relevant technology of aero-engines in China mostly improves the efficiency of an aero-engine from the perspectives of material and structure, but seldom makes improvement and optimization in the field of control. Although the improvement in material and structure can improve the efficiency of a turbofan engine, the optimization in the field of control can give better play to the potential of the current aero-engine and extend the service life of the turbofan engine. In the early design stage of the aero-engine, a controller thereof is realized in the form of a mechanical device and a hydraulic structure; although the stability is good, only a simple control strategy can be realized and no complex control algorithm can be applied. With the improvement of digital electronic technology, a full authority digital electronic controller (FADEC) is gradually applied to the specific implementation of a turbofan engine control system, and has many advantages such as that the control strategy is easy to modify and complex algorithms are able to be realized.

The control of the turbofan engine can be divided into several stages, such as start/stop control, steady state control, accelerate/decelerate control, and augmentation control according to the different stages which the turbofan engine is in. The present invention does not relate to a start/stop control part.

Steady state control refers to the control process of maintaining the engine speed unchanged at any point in the process from idle speed to maximum speed of the turbofan engine. A PID control algorithm is mostly adopted in the steady state control of a traditional turbofan engine, which requires to obtain a linear model for small deviations of the turbofan engine at each steady state point, tune PID parameters for all linear models to obtain the increment of turbofan engine fuel, and act together with steady state fuel as actual fuel input variables of the turbofan engine. This method is simple in principle, but involves many aspects such as linear model identification, PID parameter tuning and gain scheduling, and the design process is quite complex.

Accelerate/decelerate control refers to the control process of a gas turbine changing rapidly between the idle speed state and the rated speed state. The aerodynamic and thermodynamic characteristics of the turbofan engine change greatly in this process, so the above-mentioned steady state controller is not competent for the work in an accelerate/decelerate process, and an accelerate/decelerate schedule is usually used in an actual process to limit the operation of the turbofan engine to a reasonable range. Once the turbofan engine is in the accelerate/decelerate schedule, the controller of the turbofan engine will give control authority to the accelerate/decelerate schedule, and the control effect will be determined by the preset accelerate/decelerate schedule.

In addition, with the increasing requirement of flexibility and working efficiency, the multi-variable control of the turbofan engine is becoming a breakthrough direction. In particular, the introduction of an afterburner in the turbofan engine makes it impossible to maintain the stable state of the turbofan engine only in the manner of tuning combustion chamber fuel. At present, the relevant actions of the turbofan engine after the afterburner is started are also schedule-based, and the control effect depends on the setting of the schedule in early stage. The multi-variable control of the turbofan engine can provide a new optimization space for aero-engine control, is beneficial to improving the comprehensive performance of the turbofan engine, and gives full play to the potential of the engine in operating process.

To sum up, the current turbofan engine control technology has many shortcomings. Firstly, the design of a turbofan engine controller is mainly focused on the design of the steady state controller, and the working boundary of the turbofan engine is limited by different schedules during accelerate/decelerate and augmentation period, so the design of the controller can only ensure the steady state performance but cannot change the transition state performance thereof; secondly, there is a problem of control authority exchange between the steady state controller and the accelerate/decelerate schedule in the operating process of the turbofan engine, resulting in that the control strategy of the controller in steady state is not unified with that in accelerate/decelerate state, so both the steady state controller and a reasonable transition state schedule as well as an action schedule of an augmentation process actuator needs to be designed; in addition, the current turbofan engine control strategy does not meet the requirements of multi-variable control, and the structure of the current control system needs to be modified a lot to meet the new requirements such as decoupling; finally, the existing turbofan engine control system needs to tune multiple groups of parameters and a large number of schedule curves, and the design process of the controller is cumbersome and inefficient.

Therefore, in order to overcome the shortcomings of the current aero-engine control system design, the present invention designs a multi-variable control system of a turbofan engine based on the ADRC. The multi-variable control system of the present invention not only treats the steady state and transition state of the turbofan engine uniformly as the same condition, but also avoids the uncertainty introduced by switching between different methods. In addition, the present invention uses the method of total disturbance estimation to uniformly observe the internal state change and external disturbance influence of the turbofan engine, and implements rejection offset, which has better robustness than the traditional method. The present invention is also applicable to gas turbines and other devices with the same functional structure or similar operating characteristic lines.

SUMMARY

Aiming at multiple problems of the existing method such as that the design process of the turbofan engine control system is complex and multi-variable control is difficult to realize depending on the schedule, the present invention provides a steady state and transition state multi-variable control method of a turbofan engine based on an active disturbance rejection control theory (ADRC).

The technical solution of the present invention is:

A steady state and transition state multi-variable control method of a turbofan engine based on an active disturbance rejection control theory (ADRC), comprising the following steps:

S1. selecting two or more groups of controlled variables and determining the control parameter requirements of each controlled variable based on multi-variable control objectives, and then determining a manipulated variable corresponding to each controlled variable in combination with a mechanism analysis method and a correlation analysis method;

the steps of determining the controlled variables and the manipulated variables are as follows:

S1.1 analyzing the control requirements of a turbofan engine, and preliminarily determining the manipulated variables $U=[u_1, \ldots, u_i, \ldots, u_n]^T$ and the controlled variables $Y=[y_1, \ldots, y_i, \ldots, y_n]^T$ according to the mechanism of the turbofan engine, wherein $u_i$ and $y_i$ are the variables of the same group in the $i^{th}$ loop;

S1.2 selecting the $i^{th}$ group of manipulated variables and controlled variables to perform analysis, maintaining other input variables $[u_1, \ldots, u_{i-1}, u_{i+1}, \ldots, u_n]^T$ of the turbofan engine as reasonable constants, and setting the sequence of the $i^{th}$ group of manipulated variables to $$\tilde{u}_i = [\tilde{u}_{i,1}, \tilde{u}_{i,2}, \ldots, \tilde{u}_{i,k}, \ldots, \tilde{u}_{i,m}]$$

where: $\tilde{u}_{i,k-1} < \tilde{u}_{i,k}$, $\tilde{u}_{i,k}$ is within the normal operation range of the manipulated variable $u_i$, and m means the number of data sampling points in this group;

S1.3 running a turbofan engine model to obtain output data $$\tilde{y}_i = [\tilde{y}_{i,1}, \ldots, \tilde{y}_{i,m}]$$

S1.4 normalizing the obtained input $\tilde{u}_i$ and output $\tilde{y}_i$ of the turbofan engine as follows:

$$\check{u}_{i,k} = \frac{\tilde{u}_{i,k} - \min(\tilde{u}_i)}{\max(\tilde{u}_i) - \min(\tilde{u}_i)}$$

$$\check{y}_{i,k} = \frac{\tilde{y}_{i,k} - \min(\tilde{y}_i)}{\max(\tilde{y}_i) - \min(\tilde{y}_i)}$$

S1.5 using the correlation analysis method to calculate a correlation coefficient $Re_i$ as follows:

$$\bar{u}_i = \frac{1}{m}\sum_{k=1}^{m}\check{u}_{i,k}$$

$$\bar{y}_i = \frac{1}{m}\sum_{k=1}^{m}\check{y}_{i,k}$$

$$\text{var}(\check{u}_i) = \sum_{k=1}^{m}(\check{u}_{i,k} - \bar{u}_i)^2$$

$$\text{var}(\check{y}_i) = \sum_{k=1}^{m}(\check{y}_{i,k} - \bar{y}_i)^2$$

$$Re_i = \frac{\sum_{k=1}^{m}(\check{u}_{i,k} - \bar{u}_i)(\check{y}_{i,k} - \bar{y}_i)}{\sqrt{\text{var}(\check{u}_i)\text{var}(\check{y}_i)}}$$

S1.6 determining whether the manipulated variable $u_i$ is used for controlling the controlled variable $y_i$ according to the obtained correlation coefficient $Re_i$; if the correlation coefficient is satisfactory, this group of parameters is selected correctly; otherwise, if the correlation between the manipulated variable and the controlled variable is not significant, the manipulated variable needs to be replaced until the correlation coefficient is satisfactory;

S2. establishing a tracking differentiator (TD) module, a linear extended state observation module and a nonlinear PD module according to the basic principle of active disturbance rejection control, building a steady state and transition state controller, and reserving the time constant $r_t$ of the TD, $w_o$ of the linear extended state observer (LESO), and $K_p$ and $K_d$ of the nonlinear PD as the parameters to be tuned;

the steps of establishing the steady state and transition state controller are as follows:

S2.1 establishing a fastest control integrated function $f_{han}(p,q,r_t,h)$ of a second-order discrete system, and the expressions thereof are as follows:

$$d = r_t \times h$$

$$d_0 = h \times d$$

$$fx = p + hq$$

$$a_0 = \sqrt{d^2 + 8r_t|fx|}$$

$$a = \begin{cases} q + \dfrac{a_0 - d}{2}\text{sign}(fx) &, |fx| > d_0 \\ q + \dfrac{fx}{h} &, |fx| \le d_0 \end{cases}$$

$$f_{han} = -\begin{cases} r_t \times \text{sign}(a) &, |a| > d \\ r_t\dfrac{a}{d} &, |a| \le d \end{cases}$$

where, $r_t$ is a parameter to be tuned and is used for tuning the length of the transition time for the output variables of the TD; the greater $r_t$ is, the shorter the transient time is; h is a simulation step size; $\text{sign}(fx)$ is a sign function, $$\text{sign}(fx) = \begin{cases} 1, fx \ge 0 \\ -1, fx < 0 \end{cases},$$

d, $d_0$, $fx$, $a_0$, a are internal variables introduced for the convenience of calculation, and $f_{han}$ is the output of the function $f_{han}(p,q,r_t,h)$;

S2.2 building the TD module according to the established function $f_{han}(p,q,r_t,h)$, the input of the TD is a control instruction $v_i$ of the $i^{th}$ loop, the output is respectively a tracking trajectory $g_i$ and a trajectory derivative $g_i'$, and the discrete-form updated expressions thereof are as follows:

$$g_i = g_i + h \times g_i'$$

$$g_i' = g_i' + h \times f_{han}(g_i - v_i, g_i', r_{t,i}, h)$$

S2.3 establishing the LESO, using the input $u_i$ and output $y_i$ of the turbofan engine as the input of extended state observation, and observing the states $\hat{y}_{e,i}$ and $S\hat{y}_{e,i}'$ of the current output variables and the total disturbance $\hat{y}_{total,i}$; the expressions thereof are shown as follows:

$$Z = [z_{1,i}, z_{2,i}, z_{3,i}]^T$$

$$Y = [\hat{y}_{e,i}, \hat{y}'_{e,i}, \hat{y}_{total,i}]^T$$

$$\dot{Z} = \begin{bmatrix} -3w_{o,i}, 1, 0 \\ -3w_{o,i}^2, 0, 1 \\ -w_{o,i}^3, 0, 0 \end{bmatrix} Z + \begin{bmatrix} 0, 3w_{o,i} \\ b_{0,i}, 3w_{o,i}^2 \\ 0, w_{o,i}^3 \end{bmatrix} \begin{bmatrix} u_i \\ y_i \end{bmatrix}$$

$$\hat{Y} = \begin{bmatrix} 1, 0, 0 \\ 0, 1, 0 \\ 0, 0, 1 \end{bmatrix} Z$$

where, $b_{0,i}$ and $w_{o,i}$ are respectively parameters of the extended state observer (ESO), $b_{0,i}$ is a model characterization parameter and is related to an actual model, and $w_{o,i}$ is a bandwidth parameter of the ESO; $u_i$ and $y_i$ are the input of the ESO, Z is a state variable of the ESO, Y is the output of the ESO, and three output variables are respectively the estimated value $\hat{y}_{e,i}$ of the output $y_i$ of the turbofan engine, the changing trend $\hat{y}_{e,i}'$ of $y_i$, and the total disturbance $\hat{y}_{total,i}$ of the turbofan engine in this loop;

S2.4 establishing a nonlinear function $fal(e,\alpha,\delta)$, and the expression thereof is shown as follows:

$$fal(e, \alpha, \delta) = \begin{cases} \dfrac{e}{\delta^{1-\alpha}} & , |e| \leq \delta \\ |e|^\alpha \text{sign}(e), & |e| > \delta \end{cases}$$

S2.5 establishing a nonlinear PD feedback controller shown as follows in accordance with the established nonlinear function:

$$u_{PD,i} = K_{p,i} fal(e_i, \alpha_{p,i}, \delta_{p,i}) + K_{d,i} fal(e_i', \alpha_{d,i}, \delta_{d,i})$$

S2.6 assembling and establishing the steady state and transition state controller of the turbofan engine in accordance with the structure of each module in the ADRC;

S3. selecting a group of manipulated variables and controlled variables as a tuned parameter control loop, maintaining the manipulated variables of the remaining loops unchanged or operate in accordance with a desired trajectory, and tuning the parameters of the steady state and transition state controller to basically meet the control requirements;

the steps of tuning the $i^{th}$ group of control parameters of the steady state and transition state controller are as follows:

S3.1 preliminarily selecting the parameters of the ESO according to the data $\tilde{u}_i$ and $\tilde{y}_i$ of the turbofan engine to meet the condition of the following expression:

$$\frac{\min(\tilde{y}_i)}{\max(\tilde{u}_i)} \leq b_{0,i} \leq \frac{\max(\tilde{y}_i)}{\min(\tilde{u}_i)}$$

S3.2 using the data $\tilde{u}_i$ and $\tilde{y}_i$ of the turbofan engine as the input of the ESO, and tuning the parameter $w_{o,i}$ of the ESO to make the output $\hat{y}_{e,i}$ of the ESO track $\tilde{y}_i$ correctly;

S3.3 inputting a reference instruction $v_i$, and tuning a parameter $r_{t,i}$ to obtain a desired transition trajectory $g_i$; when the trajectory transition time is too long, increasing the parameter $r_{t,i}$; otherwise, decreasing $r_{t,i}$;

S3.4 using $e_i = g_i - \hat{y}_{e,i}$ and $e_i' = g_i' - \hat{y}_{e,i}'$ as the input of a nonlinear PD controller, and tuning $K_{p,i}$ and $K_{d,i}$ to reasonable values; the output thereof is $u_{PD,i}$;

S3.5 calculating the output of the steady state and transition state controller as $$u_i = \frac{u_{PD,i} - \hat{y}_{total,i}}{b_{0,i}}$$

S3.6 forming a closed loop by the controller and the turbofan engine, and then comprehensively tuning $K_{p,i}$, $K_{d,i}$, $w_{o,i}$ and $b_{0,i}$ to ensure that the controlled variable $y_i$ can track a given trajectory well;

S4. establishing an upper limit protection function $fun_l(x_i, x_{i,l}, x_{i,dl}, u_{j,l})$, designing a state/performance parameter protection controller of the turbofan engine based on this function, and limiting the output of the control loop to ensure that the controlled variables of the system meet the control requirements while the state parameters thereof do not exceed the limit;

the steps of establishing the state/performance parameter protection controller of the turbofan engine are as follows:

S4.1 determining the limiting value $x_{i,l}$ of a limit protection parameter and the action range $x_{i,dl}$ of a limit protection controller according to the control objectives of the turbofan engine;

S4.2 establishing the upper limit protection function $fun_l (x_i, x_{i,l}, x_{i,dl}, u_{j,l})$, and the formula thereof is as follows:

$$fun_l(x_i, x_{i,l}, x_{i,dl}, u_{j,l}) = \begin{cases} 0 & , x_i \leq x_{i,l} - x_{i,dl} \\ u_{j,l} \times \dfrac{\dfrac{x_{i,dl}}{x_i - x_{i,l}} + 1}{\dfrac{x_{i,dl}}{-0.1 x_{i,dl}} + 1} & , x_{i,l} - x_{i,dl} < x_i < x_{i,l} - 0.1 x_{i,dl} \\ u_{j,l} & , x_i \geq x_{i,l} - 0.1 x_{i,dl} \end{cases}$$

where, $x_i$ is a turbofan engine parameter requiring limit protection, $x_{i,l}$ is the allowable maximum value of $x_i$, $x_{i,dl}$ is the size of the operating range of the limit protection controller, i.e. the controller comes into action when $x_i > x_{i,l} - x_{i,dl}$, and $u_{j,l}$ means the maximum value that the limit protection controller can output, wherein j means that the controller output corresponding to the limit protection parameter is not related to the sequence of the manipulated variables of the turbofan engine;

S4.3 establishing a discrete-state dead band link based on the limit protection function, and the expression thereof is shown as follows:

$$fun_{out}(k) = \begin{cases} fun_l(x_{i,k}, x_{i,l}, x_{i,dl}, u_{j,l}) & , \text{if } |x_{i,k} - x_{i,k-1}| > \Delta_i \text{ or} \\ & |x_{i,k} + x_{i,k-2} - 2x_{i,k-1}| > \Delta_i' \\ fun_l(x_{i,k-1}, x_{i,l}, x_{i,dl}, u_{j,l}) & , \text{otherwise} \end{cases}$$

where, $fun_{out}(k)$ means the output of the limit protection controller at the $k^{th}$ time point, $x_{i,k}$, $x_{i,k-1}$, $x_{i,k-2}$ are respectively the numerical values of the turbofan engine parameter at the $k^{th}$, $(k-1)^{th}$ and $(k-2)^{th}$ time points, and $\Delta_i$ and $\Delta_i'$ are respectively the sizes of a position dead band and a speed dead band;

S4.4 connecting the output of the limit protection controller to the control loop in the form of negative feedback, and tuning the maximum value $u_{j,l}$ that the limit protection controller can output to ensure that the limit protection controller can fulfill the role of over-limit protection;

S5. conducting a multi-variable controller test, and finely tuning each parameter to ensure the overall effect of the turbofan engine so as to enhance the adaptability of a multi-variable control system of the turbofan engine to the change of external environment.

The present invention has the following beneficial effects that: the steady state and transition state multi-variable control system of a turbofan engine of the design of the present invention can not only achieve the objective that a turbofan engine requires multi-input and multi-output to operate simultaneously according to a predetermined trajectory and meet the control requirements, but also has the advantages of less difficult controller design method, fewer parameters to be tuned, clearer physical significances and greatly improved system robustness compared with the traditional control. Therefore, the present invention provides a new and more effective control idea for the multi-variable control of the turbofan engine, which can establish a real-time limit protection controller on the basis of meeting the multi-variable control requirement, steady state control requirement, servo control requirement and disturbance rejection control performance requirement of the turbofan engine to ensure that the turbofan engine operates within a safe range at all time points and prevent the turbofan engine from dangers. At the same time, the estimation ability of the ADRC for unknown disturbances is fully used in this method to take the coupling among the loops in the multi-variable control of the turbofan engine as the total disturbance for estimation, so no special treatment for the coupling part is needed. This method can not only completely replace the traditional control strategy based on PID, but also cooperate with the traditional limit protection strategy with min-max as the core, with flexible and diverse implementation methods and simple logic structure. At the same time, this method is also applicable to the design of the control systems of gas turbines with a similar structure and internal combustion engines with a similar working principle, and the application range is wide.

DETAILED DESCRIPTION

Figure 1:
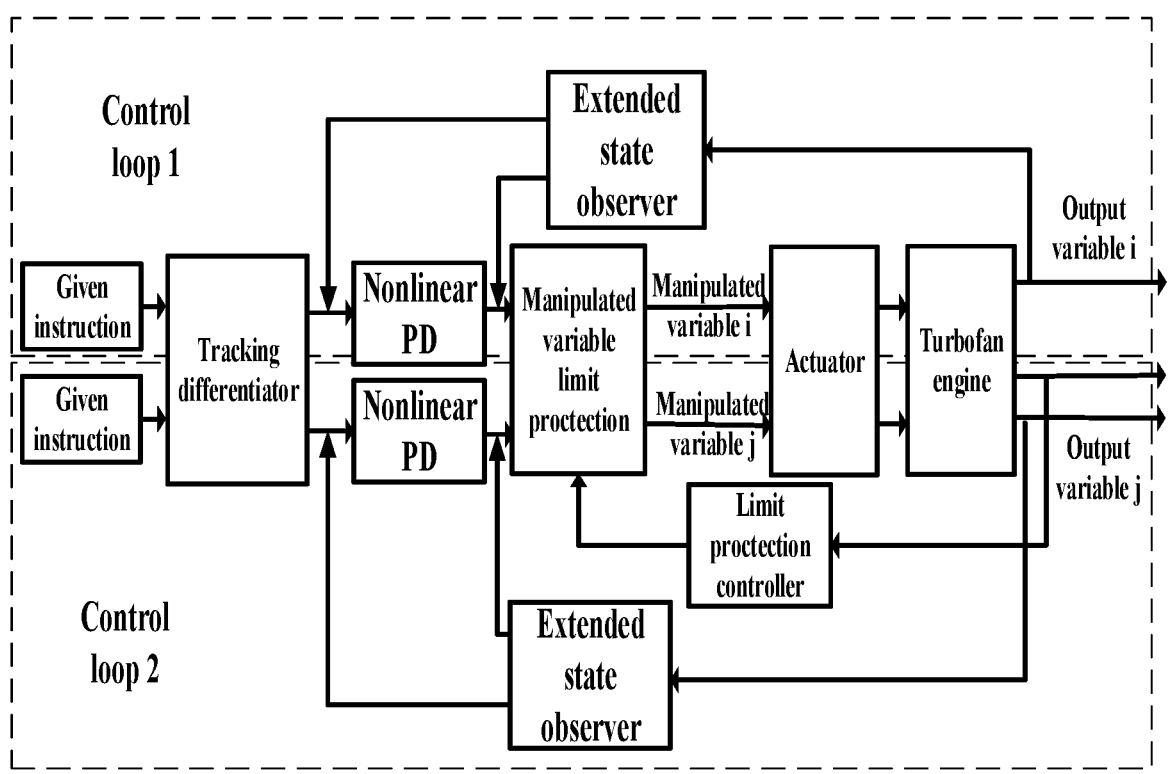
FIG. 1 is a control structure diagram of a steady state and transition state multi-variable control method of a turbofan engine based on an active disturbance rejection control theory (ADRC)

The present invention is further described below in combination with the drawings. The present invention replies on the background of a nonlinear model of a certain type of twin-spool turbofan engine, and the control structure diagram is shown in FIG. 1.

Figure 2:
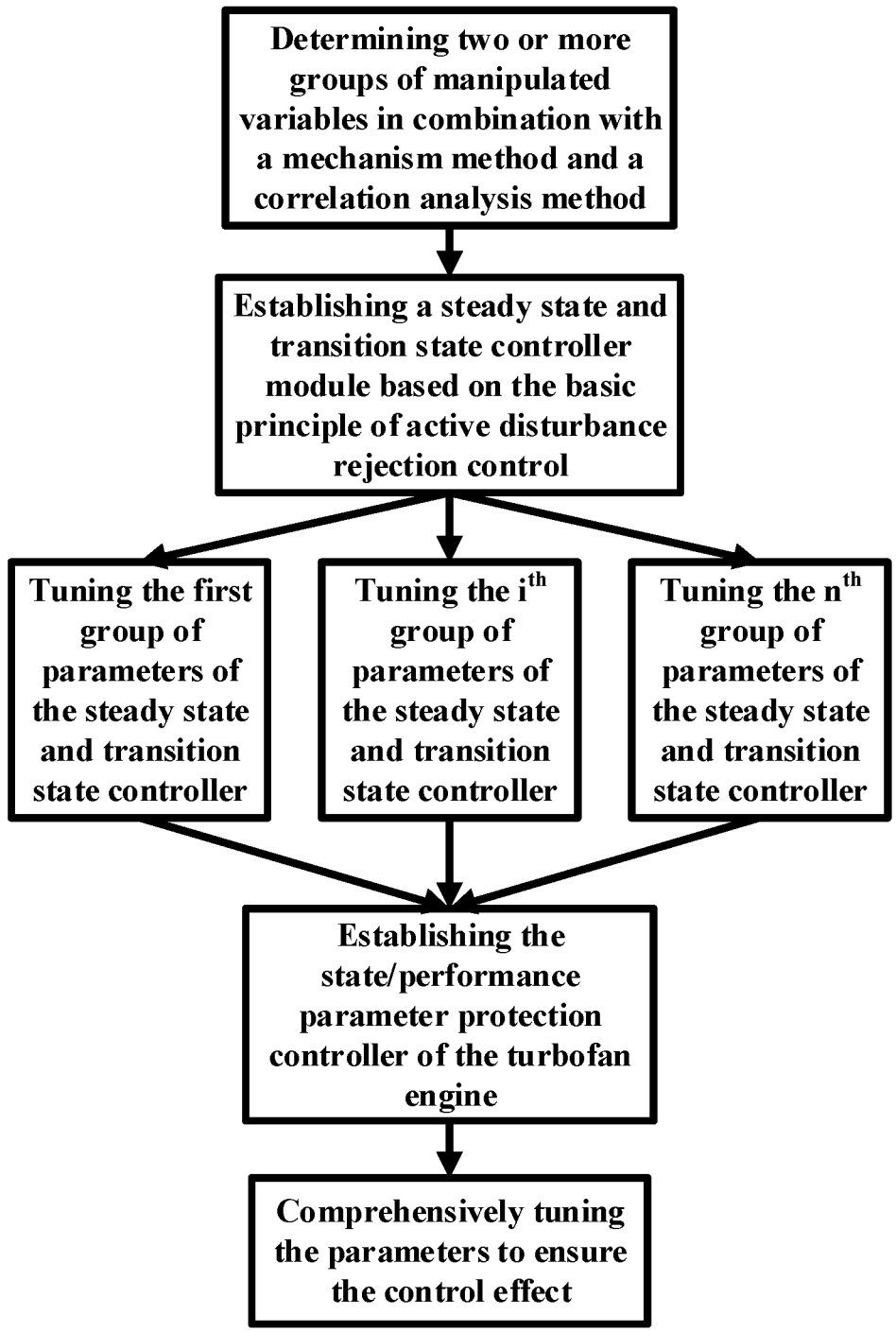
FIG. 2 is a design flow chart of a steady state and transition state multi-variable control method of a turbofan engine based on an active disturbance rejection control theory (ADRC)

As shown in FIG. 2, a steady state and transition state multi-variable control method of a turbofan engine based on an active disturbance rejection control theory (ADRC) mainly comprises the following steps:

S1. selecting two or more groups of controlled variables and determining the control parameter requirements of each controlled variable based on multi-variable control objectives, and then determining a manipulated variable corresponding to each controlled variable in combination with a mechanism analysis method and a correlation analysis method;

S2. establishing a tracking differentiator (TD) module, a linear extended state observation module and a nonlinear PD module according to the basic principle of active disturbance rejection control, building a steady state and transition state controller, and reserving the time constant $r_t$ of the TD, $w_o$ of the linear extended state observer (LESO), and $K_p$ and $K_d$ of the nonlinear PD as the parameters to be tuned;

S3. selecting a group of manipulated variables and controlled variables as a tuned parameter control loop, maintaining the manipulated variables of the remaining loops unchanged or operate in accordance with a desired trajectory, and tuning the parameters of the steady state and transition state controller to basically meet the control requirements;

S4. establishing an upper limit protection function $fun_i(x_i, x_{i,l}, x_{i,dl}, u_{j,l})$, designing a state/performance parameter protection controller of the turbofan engine based on this function, and limiting the output of the control loop to ensure that the controlled variables of the system meet the control requirements while the state parameters thereof do not exceed the limit;

S5. conducting a multi-variable controller test, and finely tuning each parameter to ensure the overall effect of the turbofan engine so as to enhance the adaptability of a multi-variable control system of the turbofan engine to the change of external environment.

Figure 3:
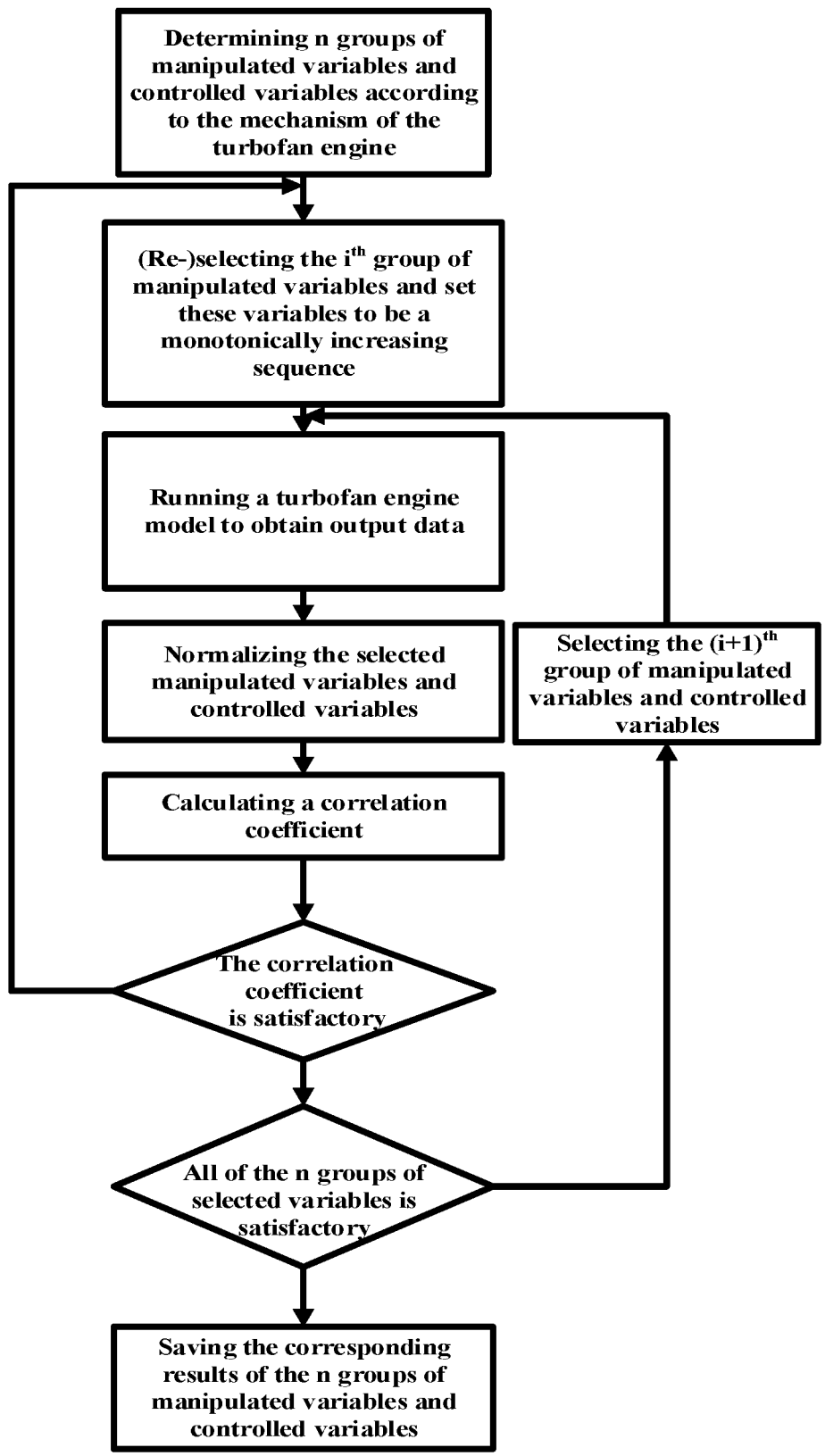
FIG. 3 is a flow chart of determining controlled variables and manipulated variables.

As shown in FIG. 3, the steps of determining the controlled variables and the manipulated variables are as follows:

S1. analyzing the control requirements of a turbofan engine, selecting the combustion chamber fuel F and the nozzle area $A_8$ of the turbofan engine as manipulated variables according to the mechanism of the turbofan engine, and selecting high-speed rotor speed $N_2$ and exit pressure ratio $\pi_T$ as controlled variables, i.e. $U=[F, A_8]^T$ and $Y=[N_2, \pi_T]^T$;

S2. selecting the first group of manipulated variables and controlled variables to perform analysis, maintaining the input variable $A_8$=0.2602 m² of the turbofan engine, and setting the value of the first group of manipulated variables to $$\tilde{F}=[\tilde{F}_1,\tilde{F}_2,\ldots,\tilde{F}_{320}]$$

where the monotonically increasing condition is met and the value is within a reasonable range;

S3 running a turbofan engine model to obtain output data $$\tilde{N}_2=[\tilde{N}_{2,1},\tilde{N}_{2,2},\ldots,\tilde{N}_{2,320}]$$

S4. normalizing the obtained input $\tilde{F}$ and output $\tilde{N}_2$ of the turbofan engine as follows:

$$\breve{F}_k = \frac{\tilde{F}_k - \min(\tilde{F})}{\max(\tilde{F}) - \min(\tilde{F})}$$

$$\breve{N}_{2,k} = \frac{\tilde{N}_{2,k} - \min(\tilde{N}_2)}{\max(\tilde{N}_2) - \min(\tilde{N}_2)}$$

S5. using the correlation analysis method to calculate a correlation coefficient $Re_1$ as follows:

$$\overline{F} = \frac{1}{320}\sum_{k=1}^{320}\breve{F}_k$$

$$\overline{N}_2 = \frac{1}{320}\sum_{k=1}^{m}\breve{N}_{2,k}$$

$$\mathrm{var}(\breve{F}) = \sum_{k=1}^{320}(\breve{F}_k - \overline{F})^2$$

$$\mathrm{var}(\breve{N}_2) = \sum_{k=1}^{320}(\breve{N}_{2,k} - \overline{N}_2)^2$$

$$Re_1 = \frac{\sum_{k=1}^{320}(\breve{F}_k - \overline{F})(\breve{N}_{2,k} - \overline{N}_2)}{\sqrt{\mathrm{var}(\breve{F})\mathrm{var}(\breve{N}_2)}}$$

S6. obtaining $Re_1$=0.9916>0.5 through the above-mentioned calculation, which indicates that the correlation between two variables is high, and the two variables can be used as a group of manipulated variables; similarly, the correlation coefficient $Re_2$=0.9979>0.5 of $A_8$ and $\pi_T$ can be obtained, so the variables can also be used as the second group of manipulated variables; if the correlation coefficient between a manipulated variable and a controlled variable is less than 0.5, the manipulated variable needs to be replaced until the correlation coefficient is satisfactory.

Figure 4:
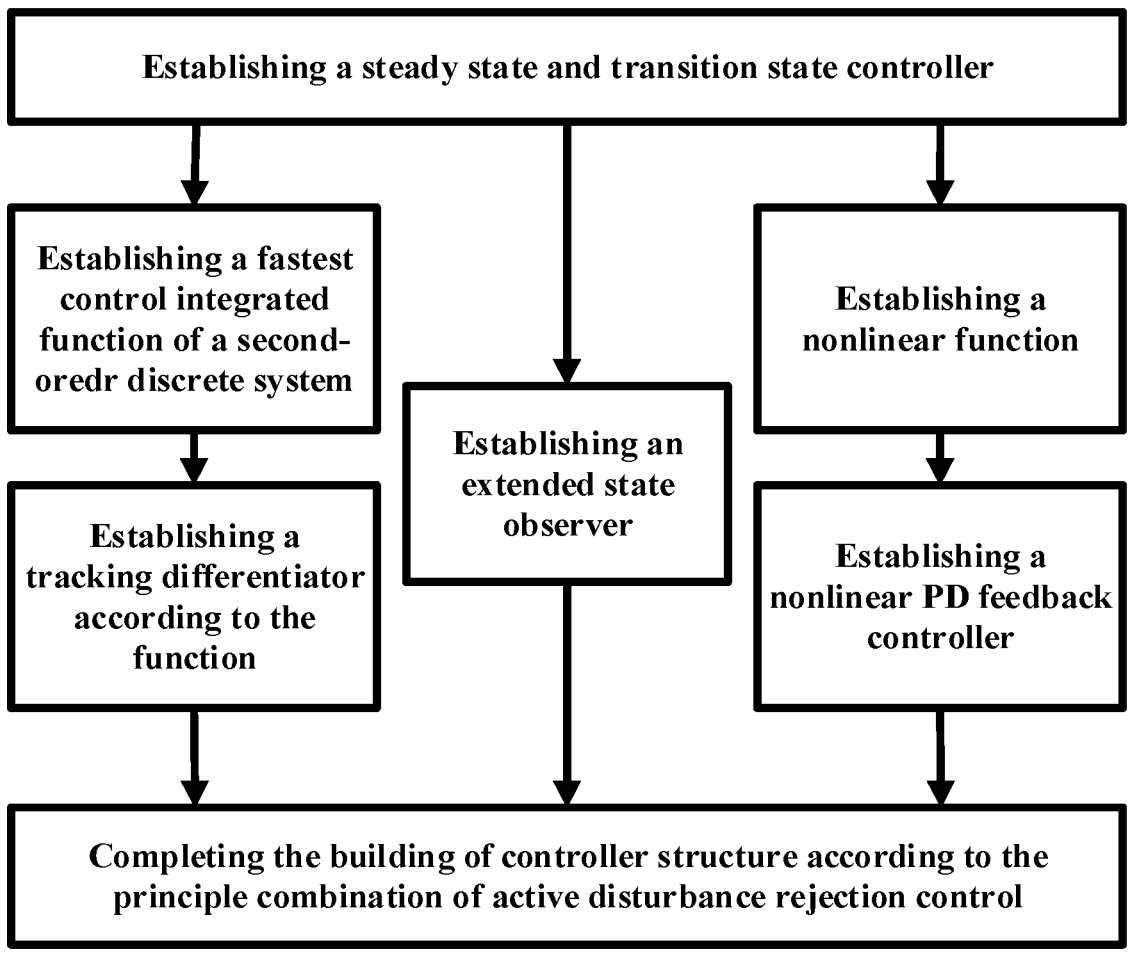
FIG. 4 is a flow chart of establishing a steady state and transition state controller.

As shown in FIG. 4, the steps of establishing the steady state and transition state controller are as follows:

S1. establishing a fastest control integrated function $f_{han}$(p,q,$r_t$, h) of a second-order discrete system, and the expressions thereof are as follows:

$$d = r_t \times h$$
$$d_0 = h \times d$$
$$fx = p + hq$$
$$a_0 = \sqrt{d^2 + 8r_t|fx|}$$

$$a = \begin{cases} q + \frac{a_0 - d}{2}\mathrm{sign}(fx) &, |fx| > d_0 \\ q + \frac{fx}{h} &, |fx| \le d_0 \end{cases}$$

$$f_{han} = -\begin{cases} r_t \times \mathrm{sign}(a) &, |a| > d \\ r_t\frac{a}{d} &, |a| \le d \end{cases}$$

where, $r_t$ is a parameter to be tuned and is used for tuning the length of the transition time for the output variables of the TD; the greater $r_t$ is, the shorter the transient time is; h is a simulation step size; sign(fx) is a sign function, $$\mathrm{sign}(fx) = \begin{cases} 1, fx \ge 0 \\ -1, fx < 0 \end{cases},$$

d, $d_0$, $fx$, $a_0$, a are internal variables introduced for the convenience of calculation, and $f_{han}$ is the output of the function $f_{han}$(p,q,$r_t$,h);

S2. building the TD module according to the established function $f_{han}$(p,q,$r_t$,h), the input of the TD is a control instruction $v_i$ of a control system, the output is respectively a tracking trajectory $g_i$ and a trajectory derivative $g_i'$, and the discrete-form updated expressions thereof are as follows:

$$g_i = g_i + h \times g_i'$$

$$g_i' = g_i' + h \times f_{han}(g_i - v_i, g_i', r_{t,i}, h)$$

S3. establishing the LESO which is used to observe the states of the current output variables and the total disturbance according to the current input $u_i$ and output $y_i$; the expressions thereof are shown as follows:

$$Z = [z_{1,i}, z_{2,i}, z_{3,i}]^T$$

$$Y = [\hat{y}_{e,i}, \hat{y}'_{e,i}, \hat{y}_{total,i}]^T$$

$$\dot{Z} = \begin{bmatrix} -3w_{o,i}, 1, 0 \\ -3w_{o,i}^2, 0, 1 \\ -w_{o,i}^3, 0, 0 \end{bmatrix} Z + \begin{bmatrix} 0, 3w_{o,i} \\ b_{0,i}, 3w_{o,i}^2 \\ 0, w_{o,i}^3 \end{bmatrix} \begin{bmatrix} u_i \\ y_i \end{bmatrix}$$

$$\hat{Y} = \begin{bmatrix} 1, 0, 0 \\ 0, 1, 0 \\ 0, 0, 1 \end{bmatrix} Z$$

where, $b_{0,i}$ and $w_{i,o}$ are respectively parameters to be tuned, $b_{0,i}$ is a model characterization parameter and is related to an actual model, and $w_{o,i}$ is a bandwidth parameter of the ESO; $u_i$ and $y_i$ are output of the ESO, Z is a state variable of the ESO, $\hat{Y}$ is the estimated output of the ESO, and three output variables are respectively the estimated value $\hat{y}_{e,i}$ of the output $y_i$ of the turbofan engine, the changing trend $\hat{y}_{e,i}'$ of $y_i$, and the total disturbance $\hat{y}_{total,i}$ of the turbofan engine in this loop;

S4. establishing a nonlinear function fal(e, α, δ), and the expression thereof is shown as follows:

$$fal(e, \alpha, \delta) = \begin{cases} \frac{e}{\delta^{1-\alpha}} &, |e| \le \delta \\ |e|^\alpha \mathrm{sign}(e) &, |e| > \delta \end{cases}$$

S5. establishing a nonlinear PD feedback controller shown as follows in accordance with the established nonlinear function:

$$u_{PD,i} = K_{p,i} fal(e_i, \alpha_{p,i}, \delta_{p,i}) + K_{d,i} fal(e_i', \alpha_{d,i}, \delta_{d,i}) \quad 5$$

Figure 5:
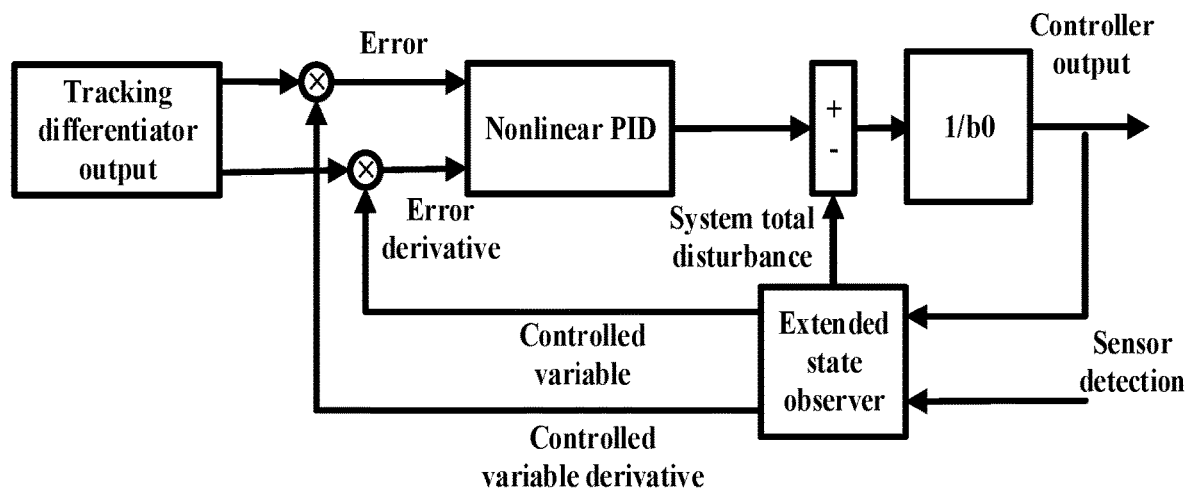
FIG. 5 is a structural diagram of an active disturbance rejection controller.

S6. assembling and establishing the steady state and transition state controller of the turbofan engine in accordance with the structure of each module in FIG. 5.

Figure 6:
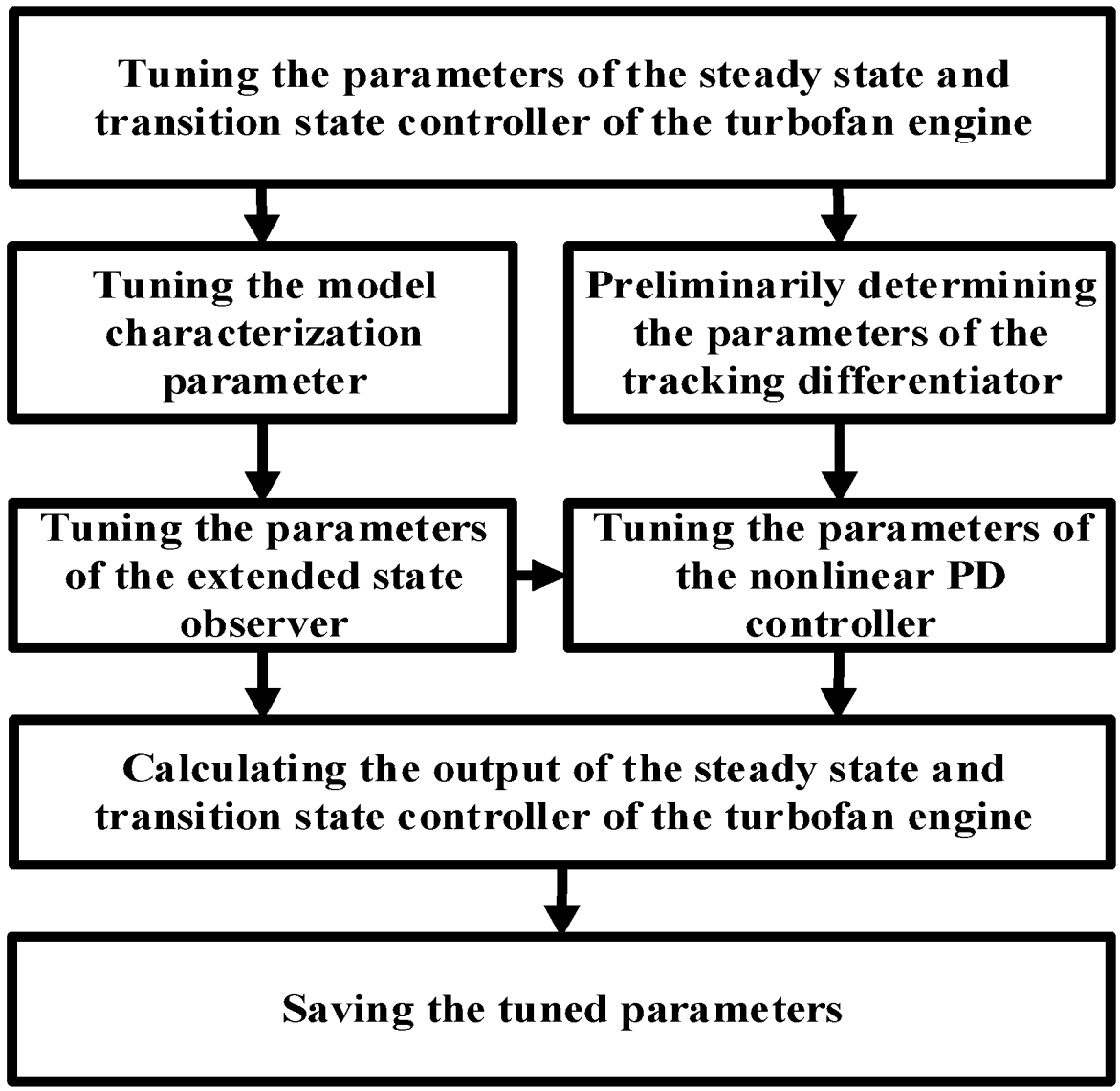
FIG. 6 is a flow chart of tuning parameters of a steady state and transition state controller.

As shown in FIG. 6, the steps of tuning the first group of control parameters of the steady state and transition state controller are as follows, and the tuning of the second group of control parameters is the same:

S1. preliminarily selecting the model characterization parameter $b_{1,0} = 200$ in the ESO according to the data $\tilde{F}$ and $\tilde{N}_2$ of the turbofan engine to meet the condition of the following expression:

$$\frac{\min(\tilde{N}_2)}{\max(\tilde{F})} \leq b_{0,1} \leq \frac{\max(\tilde{N}_2)}{\min(\tilde{F})}$$

S2. preliminarily selecting $w_{o,1} = 1$ of the ESO, using the data $\tilde{F}$ and $\tilde{N}_2$ of the turbofan engine as the input of the ESO, and observing whether the estimated value $\hat{N}_{2,e}$ of the output thereof, i.e. $N_2$ can track $\tilde{N}_2$ correctly; if the tracking effect is poor, increasing the value of $w_{o,1}$, and observing the tracking effect; if the tracking effect is still poor when $w_{o,1}$ is relatively great (for example $w_{o,1} > 100$), decreasing $b_{0,1}$ moderately, and observing the tracking effect after retuning until the observed effect is good;

S3. inputting a reference instruction $v_1$, and tuning a parameter $r_{t,1}$ to obtain a desired transition trajectory $g_i$; when the trajectory transition time is too long, increasing the parameter $r_{t,1}$; otherwise, decreasing $r_{t,1}$;

S4. using $e_1 = g_1 - \hat{y}_{e,1}$ and $e_1' = g_1' - \hat{y}_{e,1}'$ as the input of a nonlinear PD controller, and tuning $K_{p,1}$ and $K_{d,1}$ to reasonable values; the output thereof is $u_{PD,1}$;

S5. calculating the output of the steady state and transition state controller as $$u_1 = \frac{u_{PD,1} - \hat{y}_{total,1}}{b_{0,1}}$$

S6. comprehensively tuning $K_{p,1}$, $K_{d,1}$, $w_{o,1}$ and $b_{0,1}$ to ensure that the controlled variable $N_2$ can track a given trajectory $g_1$ well; after repeated tuning, the finally obtained parameter combination with better effect is $K_{p,1} = 600$, $K_{d,1} = 30$, $b_{0,1} = 200$, $w_{o,1} = 40$, $r_{t,1} = 5000$; similarly, the effect is better when the parameters of $A_8$ and $\pi_T$ control loops are $K_{p,2} = 50$, $K_{d,2} = 10$, $b_{0,2} = 3000$, $w_{o,2} = 30$, $r_{t,2} = 1$.

Figure 7:
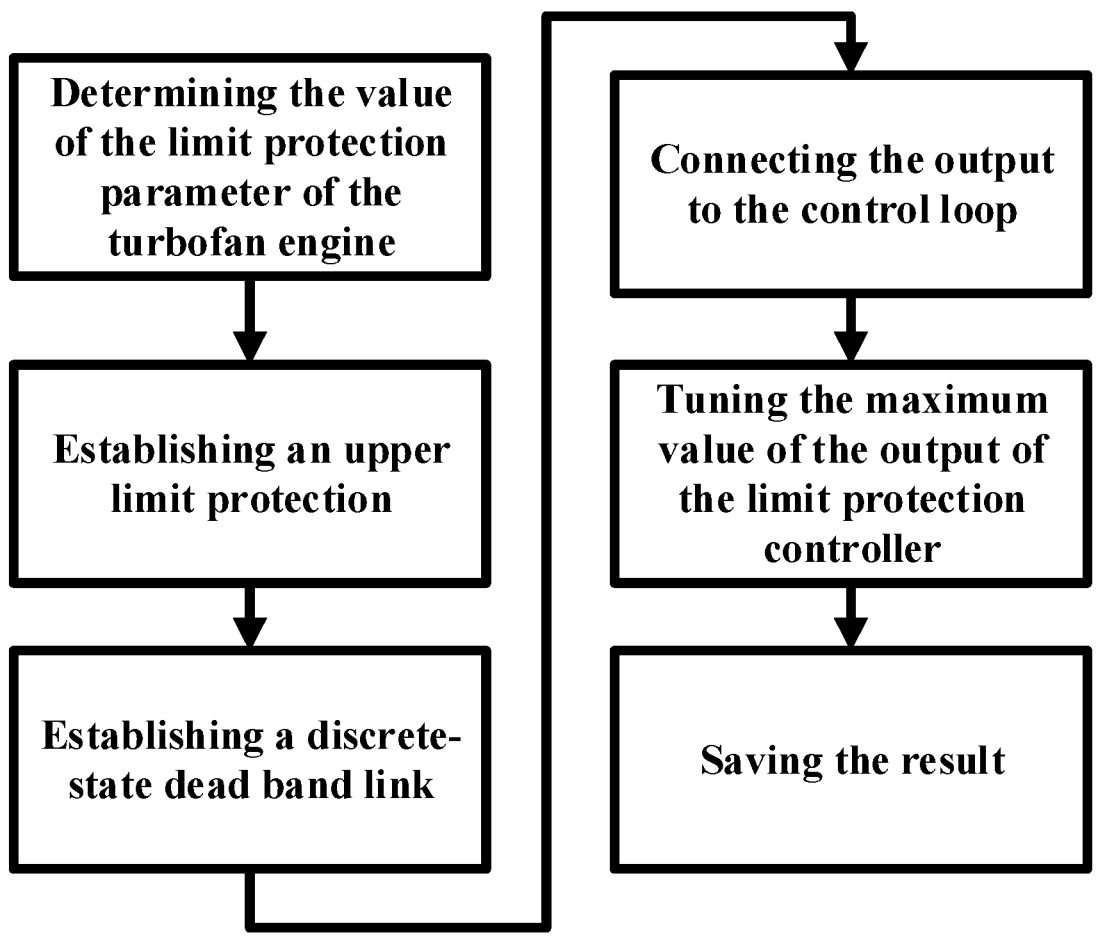
FIG. 7 is a design flow chart of a limit protection controller.

As shown in FIG. 7, the steps of establishing the state/performance parameter protection controller of the turbofan engine are as follows:

S1. determining the temperature limit $T_{4,1C,l} = 1700K$ and the parameter value $T_{4,1C,dl} = 30K$ when a limit protection controller comes into action according to the control objectives of the turbofan engine;

S2. establishing the upper limit protection function $fun_l$ $(T_{4,1C}, T_{4,1C,l}, T_{4,1C,dl}, F_l)$ according to the formula, i.e.

$$fun_l(T_{4,1C}, T_{4,1C,l}, T_{4,1C,dl}, F_l) = \begin{cases} 0 & , T_{4,1C} \leq T_{4,1C,l} - T_{4,1C,dl} \\ F_l \times \frac{\frac{T_{4,1C,dl}}{T_{4,1C} - T_{4,1C,l}} + 1}{\frac{T_{4,1C,dl}}{-0.1T_{4,1C,dl}} + 1} & T_{4,1C,l} - T_{4,1C,dl} < T_{4,1C} < T_{4,1C,l} - 0.1T_{4,1C,dl} \\ F_l & , T_{4,1C} \geq T_{4,1C,l} - 0.1T_{4,1C,dl} \end{cases}$$

S3. establishing a discrete-state dead band link based on the limit protection function, and the expression thereof is shown as follows:

$$fun_{out}(k) = \begin{cases} fun_l(T_{4,1C,k}, T_{4,1C,l}, T_{4,1C,dl}, F_l) & , \text{if } |x_{i,k} - x_{i,k-1}| > 2 \text{ or } \\ & |x_{i,k} + x_{i,k-2} - 2x_{i,k-1}| > 5 \\ fun_l(T_{4,1C,k-1}, T_{4,1C,l}, T_{4,1C,dl}, F_l) & , \text{otherwise} \end{cases}$$

where, the two parameters of the dead band are respectively selected as $\Delta_l = 2$, $\Delta_l' = 5$;

S4. connecting the output of the limit protection controller to the control loop in the form of negative feedback, and selecting the maximum value $F_l = 300$ kg/h that the limit protection controller can output to ensure that the limit protection controller can fulfill the role of over-limit protection.

Figure 8:
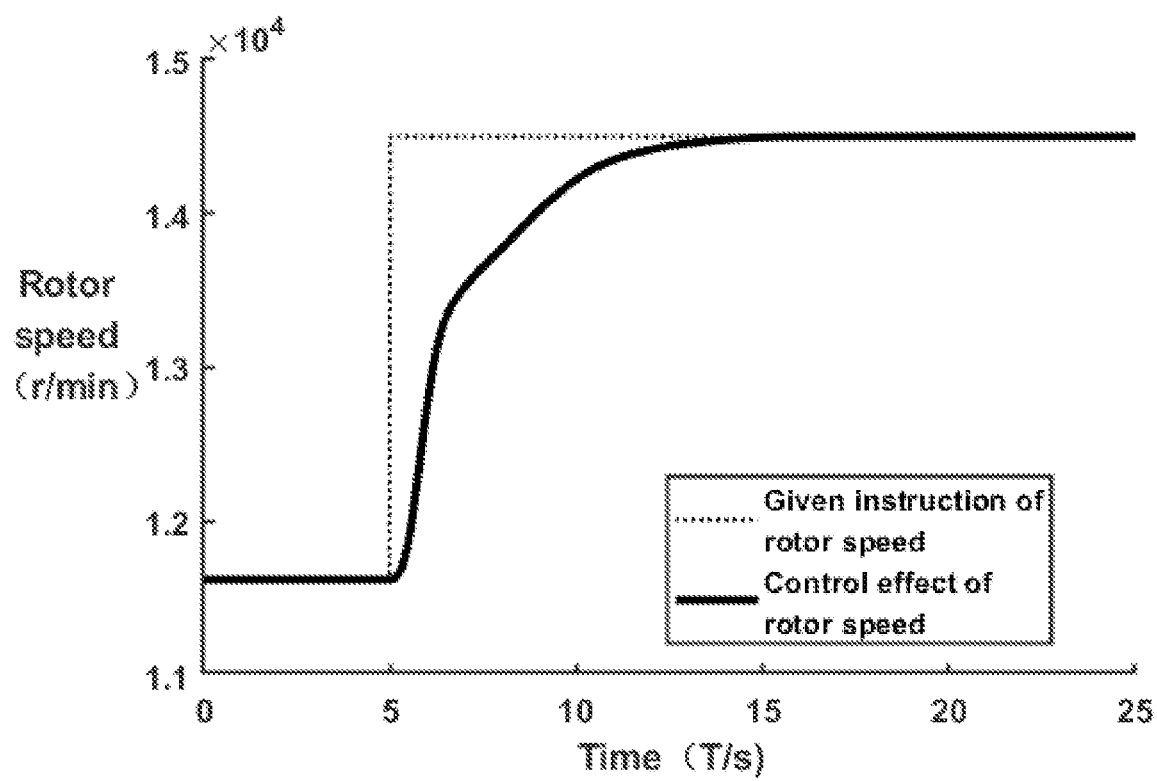
FIG. 8 is an effect diagram of the speed control of a certain type of turbofan engine under a certain working condition.
Figure 9:
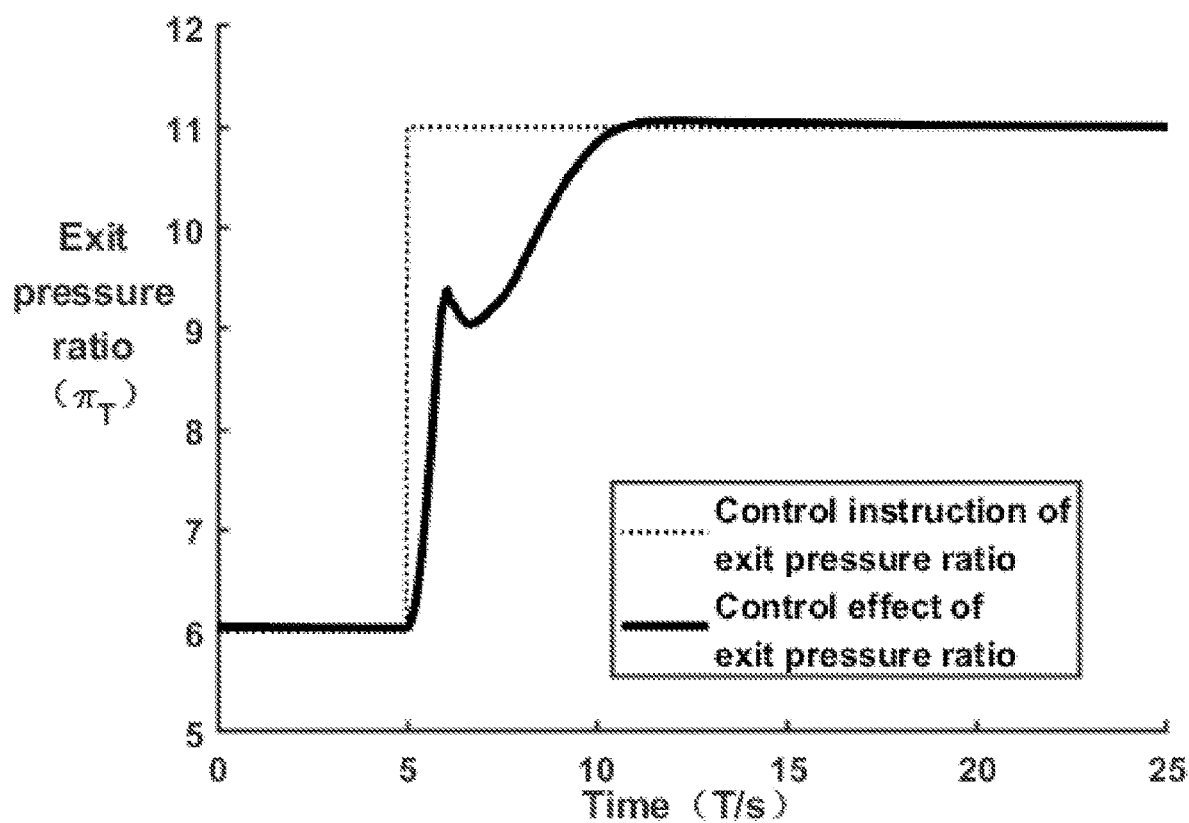
FIG. 9 is an effect diagram of the exit pressure ratio control of a certain type of turbofan engine under a certain working condition.

The control effect of a steady state and transition state multi-variable controller of a turbofan engine based on an active disturbance rejection control theory (ADRC) after the design is completed is shown in FIG. 8 and FIG. 9; in the process of speed control, the maximum overshoot is 0, the settling time is 9.93 seconds, and the steady-state error is 0.05 r/min, taking a proportion of less than 0.01% in the whole process; in the process of exit pressure ratio control, the maximum overshoot is 0.55%, the settling time is 9.83 seconds, the peak time is 12.13 seconds, and the steady-state error is 0.0074, taking a proportion of 0.15% in the whole process.

Figure 10:
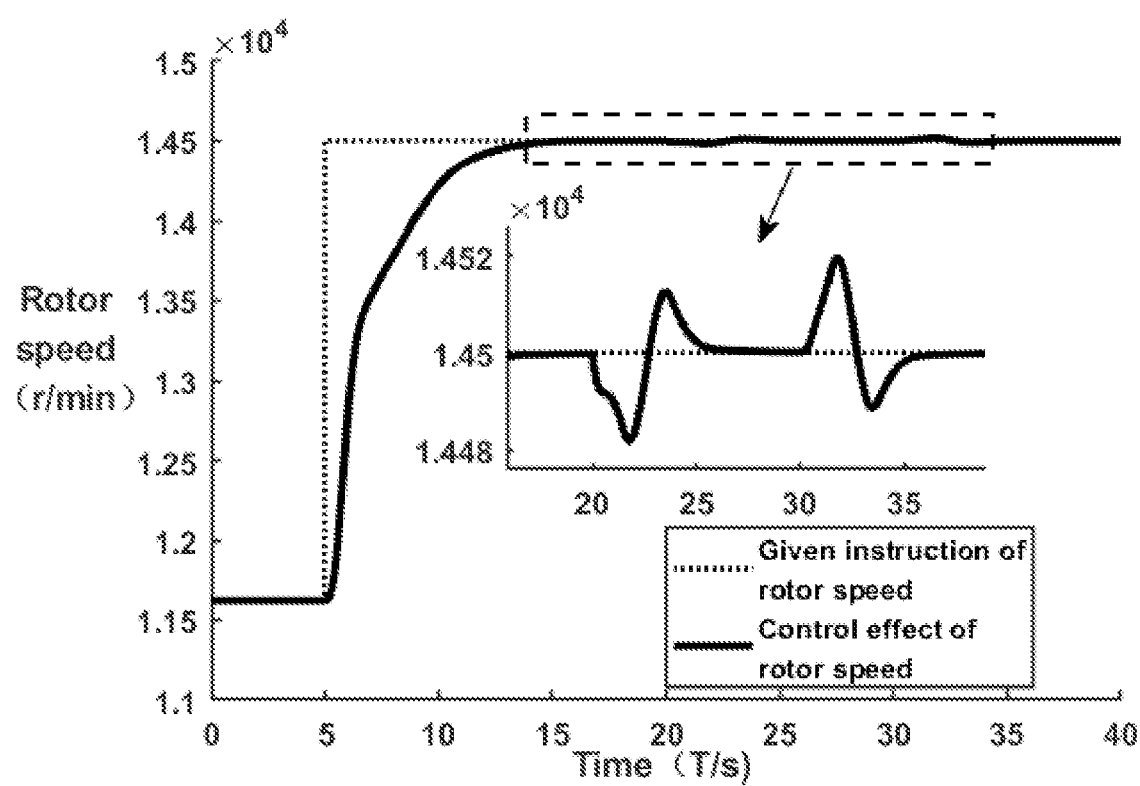
FIG. 10 is an effect diagram of the speed disturbance rejection control of a certain type of turbofan engine under a certain working condition.
Figure 11:
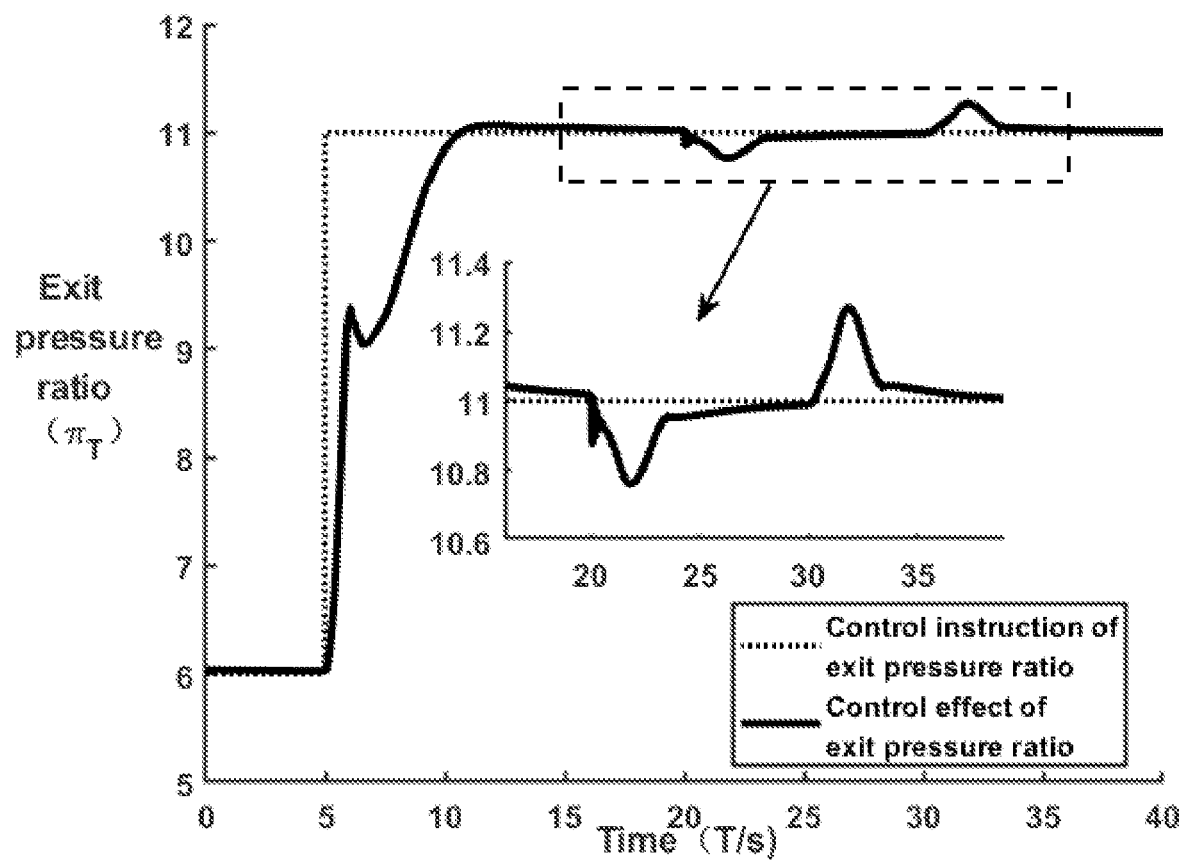
FIG. 11 is an effect diagram of the exit pressure ratio disturbance rejection control of a certain type of turbofan engine under a certain working condition.

For the disturbance rejection control performance of this method, the turbofan engine is operated to the declared working condition without changing the controller parameters, and the influence of the disturbance on the control effect is observed by applying augmentation fuel. FIG. 10 and FIG. 11 are diagrams of adding the augmentation fuel with amplitude of 2000 kg/h at the 20th second after stable operation and canceling this disturbance at the 30th second. It can be seen from the figures that in the process of augmentation, the maximum overshoot of rotor speed is 0.14%, the settling time of rotor speed is 6.83 seconds, the maximum overshoot of exit pressure ratio is 2.17%, and the settling time of exit pressure ratio is 11.55 seconds; in the process of augmentation cancellation, the maximum overshoot of rotor speed is 0.13%, the settling time of rotor speed is 6.88 seconds, the maximum overshoot of exit pressure ratio is 2.45%, and the settling time of exit pressure ratio is 9.88 seconds.

Figure 12:
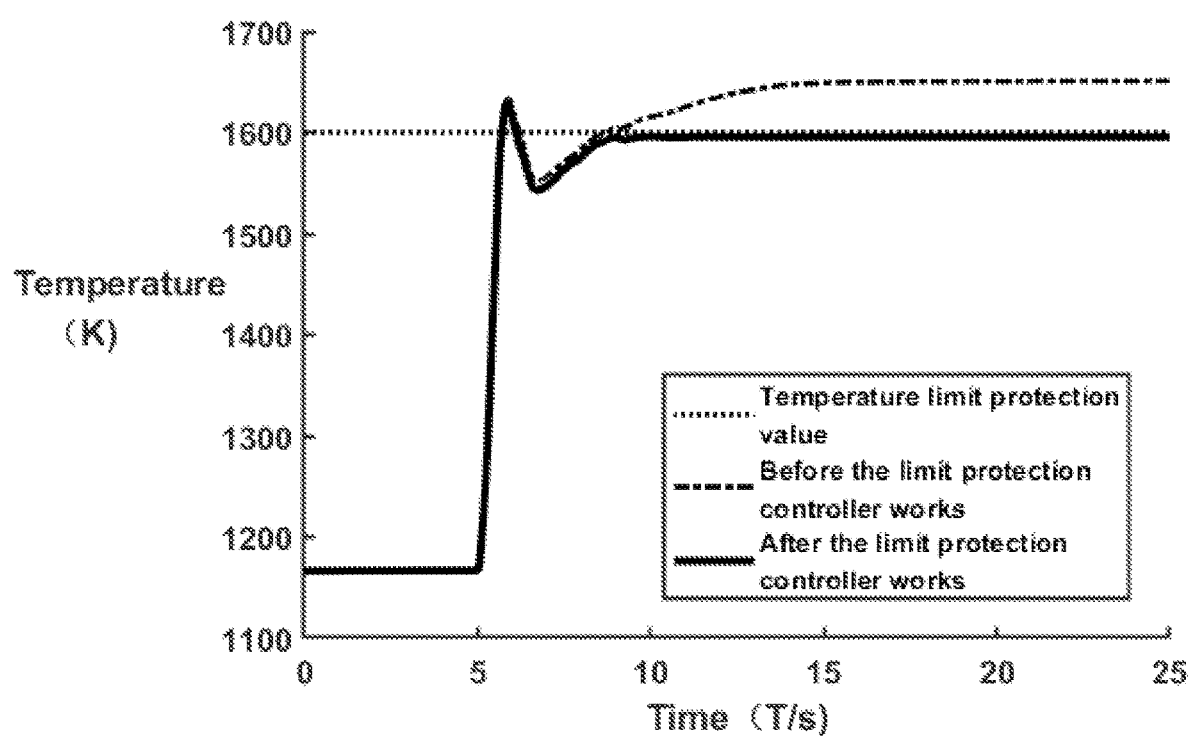
FIG. 12 is an effect diagram of the temperature control of a turbofan engine under a certain type of certain working condition.

For the performance test of the limit protection controller, since this controller will not be triggered under normal circumstances, the limiting value of the limit protection parameter needs to be lowered to observe the effect thereof. Here, the temperature limit protection is modified to $T_{4,1C,l} = 1600K$, and the control effect is shown in FIG. 12. It can be seen from FIG. 12 that the output temperature of the temperature limit protection controller is lower than 1600K after the controller works.

In conclusion, using the steady state and transition state multi-variable control method of a turbofan engine based on an active disturbance rejection control theory (ADRC) can meet the control requirements of the turbofan engine and ensure that the turbofan engine operates within a safe range.

The invention claimed is:

1. A steady state and transition state multi-variable control method of a turbofan engine based on an active disturbance rejection control theory (ADRC), comprising the following steps:

S1. selecting two or more groups of controlled variables and determining control parameter requirements of each controlled variable based on multi-variable control objectives, and then determining a manipulated variable corresponding to each controlled variable in combination with a mechanism analysis method and a correlation analysis method;

the steps of determining the controlled variables and the manipulated variables are as follows:

S1.1 analyzing the control requirements of a turbofan engine, and preliminarily determining the manipulated variables $U=[u_1, \ldots, u_i, \ldots, u_n]^T$ and the controlled variables $Y=[y_1, \ldots, y_i, \ldots, y_n]^T$ according to the mechanism of the turbofan engine, wherein $u_i$ and $y_i$ are the variables of the same group in the $i^{th}$ loop;

S1.2 selecting the $i^{th}$ group of manipulated variables and controlled variables to perform analysis, maintaining other input variables $[u_1, \ldots, u_{i+1}, \ldots u_n]$ of the turbofan engine as reasonable constants, and setting the sequence of the $i^{th}$ group of manipulated variables to $$\tilde{u}_i = [\tilde{u}_{i,1}, \tilde{u}_{i,2}, \ldots, \tilde{u}_{i,k}, \ldots, \tilde{u}_{i,m}]$$

where: $\tilde{u}_{i,k-1} < \tilde{u}_{i,k}$, $\tilde{u}_{i,k}$ is within normal operation range of the manipulated variable $u_i$, and m means a number of data sampling points in this group;

S1.3 running a turbofan engine model to obtain output data $$\tilde{y}_i = [\tilde{y}_{i,1}, \ldots \tilde{y}_{i,m}]$$

S1.4 normalizing the obtained input $\tilde{u}_i$ and output $\tilde{y}_i$ of the turbofan engine as follows:

$$\tilde{u}_{i,k} = \frac{\tilde{u}_{i,k} - \min(\tilde{u}_i)}{\max(\tilde{u}_i) - \min(\tilde{u}_i)}$$

$$\tilde{y}_{i,k} = \frac{\tilde{y}_{i,k} - \min(\tilde{y}_i)}{\max(\tilde{y}_i) - \min(\tilde{y}_i)}$$

S1.5 using the correlation analysis method to calculate a correlation coefficient $Re_i$ as follows:

$$\bar{u}_i = \frac{1}{m}\sum_{k=1}^{m} \tilde{u}_{i,k}$$

$$\bar{y}_i = \frac{1}{m}\sum_{k=1}^{m} \tilde{y}_{i,k}$$

$$\text{var}(\tilde{u}_i) = \sum_{k=1}^{m}(\tilde{u}_{i,k} - \bar{u}_i)^2$$

$$\text{var}(\tilde{y}_i) = \sum_{k=1}^{m}(\tilde{y}_{i,k} - \bar{y}_i)^2$$

$$Re_i = \frac{\sum_{k=1}^{m}(\tilde{u}_{i,k} - \bar{u}_i)(\tilde{y}_{i,k} - \bar{y}_i)}{\sqrt{\text{var}(\tilde{u}_i)\text{var}(\tilde{y}_i)}}$$

S1.6 determining whether the manipulated variable $u_i$ is used for controlling the controlled variable $y_i$ according to the obtained correlation coefficient $Re_i$; if the correlation coefficient is satisfactory, this group of parameters is selected correctly; otherwise, if the correlation between the manipulated variable and the controlled variable is not significant, the manipulated variable needs to be replaced until the correlation coefficient is satisfactory;

S2. establishing a tracking differentiator (TD) module, a linear extended state observation module and a nonlinear PD module according to the basic principle of active disturbance rejection control, building a steady state and transition state controller, and reserving the time constant $r_t$ of the TD, $w_o$ of the linear extended state observer (LESO), and $K_p$ and $K_d$ of the nonlinear PD as the parameters to be tuned;

the steps of establishing the steady state and transition state controller are as follows:

S2.1 establishing a fastest control integrated function $f_{han}(p,q,r_t,h)$ of a second-order discrete system, and the expressions thereof are as follows:

$$d = r_t \times h$$

$$d_0 = h \times d$$

$$fx = p + hq$$

$$a_0 = \sqrt{d^2 + 8r_t|fx|}$$

$$a = \begin{cases} q + \frac{a_0 - d}{2}\text{sign}(fx) &, |fx| > d_0 \\ q + \frac{fx}{h} &, |fx| \le d_0 \end{cases}$$

$$f_{han} = -\begin{cases} r_t \times \text{sign}(a) &, |a| > d \\ r_t \frac{a}{d} &, |a| \le d \end{cases}$$

where, $r_t$ is a parameter to be tuned and is used for tuning the length of the transition time for the output variables of the TD; the greater $r_t$ is, the shorter the transient time is; h is a simulation step size; sign($fx$) is a sign function, $$\text{sign}(fx) = \begin{cases} 1 &, fx \ge 0 \\ -1 &, fx < 0 \end{cases},$$

are internal variables introduced for the convenience of calculation, and $f_{han}$ is the output of the function $f_{han}(p,q,r_t,h)$;

S2.2 building the TD module according to the established function $f_{han}(p,q,r_t,h)$, the input of the TD is a control instruction $v_i$ of the $i^{th}$ loop, the output is respectively a tracking trajectory $g_i$ and a trajectory derivative $g_i'$, and the discrete-form updated expressions thereof are as follows:

$$g_i = g_i + h \times g_i'$$

$$g_i' = g_i' + h \times f_{han}(g_i - v_i, g_i', r_{t,i}, h)$$

S2.3 establishing the LESO, using the input $u_i$ and output $y_i$ of the turbofan engine as the input of extended state observation, and observing the states $\hat{y}_{e,i}$ and $\hat{y}_{e,i}'$ of the current output variables and the total disturbance $\hat{t}_{total,i}$; the expressions thereof are shown as follows:

$$Z = [z_{1,i}, z_{2,i}, z_{3,i}]^T$$

$$Y = [\hat{y}_{e,i}, \hat{y}_{e,i}', \hat{y}_{total,i}]^T$$

$$\dot{Z} = \begin{bmatrix} -3w_{o,i}, 1, 0 \\ -3w_{o,i}^2, 0, 1 \\ -w_{o,i}^3, 0, 0 \end{bmatrix} Z + \begin{bmatrix} 0, 3w_{o,i} \\ b_{0,i}, 3w_{o,i}^2 \\ 0, w_{o,i}^3 \end{bmatrix} \begin{bmatrix} u_i \\ y_i \end{bmatrix}$$

$$\hat{Y} = \begin{bmatrix} 1,0,0 \\ 0,1,0 \\ 0,0,1 \end{bmatrix} Z$$

where, $b_{0,i}$ and $w_{o,i}$ are respectively parameters of the extended state observer (ESO), $b_{0,i}$ is a model characterization parameter and is related to an actual model, and $w_{o,i}$ is a bandwidth parameter of the ESO; $u_i$ and $y_i$ are the input of the ESO, Z is a state variable of the ESO, $\hat{Y}$ is the output of the ESO, and three output variables are respectively the estimated value $\hat{y}_{e,i}$ of the output $\hat{y}_i$ of the turbofan engine, the changing trend $\hat{y}_{e,i}'$ of $\hat{y}_i$, and the total disturbance $\hat{y}_{total,i}$ of the turbofan engine in this loop;

S2.4 establishing a nonlinear function $fal(e,\alpha,\delta)$, and the expression thereof is shown as follows:

$$fal(e, \alpha, \delta) = \begin{cases} \dfrac{e}{\delta^{1-\alpha}} & , |e| \leq \delta \\ |e|^{\alpha} \text{sign}(e) & , |e| > \delta \end{cases}$$

S2.5 establishing a nonlinear PD feedback controller shown as follows in accordance with the established nonlinear function:

$$u_{PD,i} = K_{p,i} fal(e_i, \alpha_{p,i}, \delta_{p,i}) + K_{d,i} fal(e_i', \alpha_{d,i}, \delta_{d,i})$$

S2.6 assembling and establishing the steady state and transition state controller of the turbofan engine in accordance with the structure of each module in the ADRC;

S3. selecting a group of manipulated variables and controlled variables as a tuned parameter control loop, maintaining the manipulated variables of the remaining loops unchanged or operate in accordance with a desired trajectory, and tuning the parameters of the steady state and transition state controller to basically meet the control requirements;

the steps of tuning the $i^{th}$ group of control parameters of the steady state and transition state controller are as follows:

S3.1 preliminarily selecting the parameters of the ESO according to the data $\tilde{u}_i$ and $\tilde{y}_i$ of the turbofan engine to meet the condition of the following expression:

$$\frac{\min(\tilde{y}_i)}{\max(\tilde{u}_i)} \leq b_{0,i} \leq \frac{\max(\tilde{y}_i)}{\min(\tilde{u}_i)}$$

S3.2 using the data $\tilde{u}_i$ and $\tilde{y}_i$ of the turbofan engine as the input of the ESO, and tuning the parameter $w_{o,i}$ of the ESO to make the output $\hat{y}_{e,i}$ of the ESO track $\hat{y}_i$ correctly;

S3.3 inputting a reference instruction $v_i$, and tuning a parameter $r_{t,i}$ to obtain a desired transition trajectory $g_i$; when the trajectory transition time is too long, increasing the parameter $r_{t,i}$; otherwise, decreasing $r_{t,i}$;

S3.4 using $e_i = g_i - \hat{y}_{e,i}$ and $e_i' = g_i' - \hat{y}_{e,i}'$ as the input of a nonlinear PD controller, and tuning $K_{p,i}$ and $K_{d,i}$ to reasonable values; the output thereof is $u_{PD,i}$;

S3.5 calculating the output of the steady state and transition state controller as $$u_i = \frac{u_{PD,i} - \hat{y}_{total,i}}{b_{0,i}}$$

S3.6 forming a closed loop by the controller and the turbofan engine, and then comprehensively tuning $K_{p,i}$, $K_{d,i}$, $w_{o,i}$ and $b_{0,i}$ to ensure that the controlled variable $y_i$ can track a given trajectory well;

S4. establishing an upper limit protection function $fun_1$ ($x_i$, $x_{i,l}$, $x_{i,dl}$, $u_{j,l}$), designing a state/performance parameter protection controller of the turbofan engine based on this function, and limiting the output of the control loop to ensure that the controlled variables of the system meet the control requirements while the state parameters thereof do not exceed the limit;

the steps of establishing the state/performance parameter protection controller of the turbofan engine are as follows:

S4.1 determining the limiting value $x_{i,l}$ of a limit protection parameter and the action range $x_{i,dl}$ of a limit protection controller according to the control objectives of the turbofan engine;

S4.2 establishing the upper limit protection function $fun_1$ ($x_i$, $x_{i,l}$, $x_{i,dl}$, $u_{j,l}$) and the formula thereof is as follows:

$$fun_l(x_i, x_{i,l}, x_{i,dl}, u_{j,l}) = \begin{cases} 0 & , x_i \leq x_{i,l} - x_{i,dl} \\ u_{j,l} \times \dfrac{\dfrac{x_{i,dl}}{x_i - x_{i,l}} + 1}{\dfrac{x_{i,dl}}{-0.1 x_{i,dl}} + 1} & , x_{i,l} - x_{i,dl} < x_i < x_{i,l} - 0.1 x_{i,dl} \\ u_{j,l} & , x_i \geq x_{i,l} - 0.1 x_{i,dl} \end{cases}$$

where, $x_i$ is a turbofan engine parameter requiring limit protection, $x_{i,l}$ is the allowable maximum value of $x_i$, $x_{i,dl}$ is the size of the operating range of the limit protection controller, i.e. the controller comes into action when $x_i > x_{i,l} - x_{i,dl}$ and $u_{j,l}$ means the maximum value that the limit protection controller can output, wherein j means that the controller output corresponding to the limit protection parameter is not related to the sequence of the manipulated variables of the turbofan engine;

S4.3 establishing a discrete-state dead band link based on the limit protection function, and the expression thereof is shown as follows:

$$fun_{out}(k) = \begin{cases} fun_l(x_{i,k}, x_{i,l}, x_{i,dl}, u_{j,l}) & , \text{if } |x_{i,k} - x_{i,k-1}| > \Delta_i \text{ or} \\ & \quad |x_{i,k} + x_{i,k-2} - 2x_{i,k-1}| > \Delta_i' \\ fun_l(x_{i,k-1}, x_{i,l}, x_{i,dl}, u_{j,l}) & , \text{otherwise} \end{cases}$$

where, $f_{out}(k)$ means the output of the limit protection controller at the $k^{th}$ time point, $x_i$, k, $x_{i,k-1}$, $x_{i,k-2}$ are respectively the numerical values of the turbofan engine parameter at the $k^{th}$, $(k-1)^{th}$ and $(k-2)^{th}$ time points, $\Delta_i$ and $\Delta_i'$ are respectively the sizes of a position dead band and a speed dead band;

S4.4 connecting the output of the limit protection controller to the control loop in the form of negative feedback, and tuning the maximum value $u_{j,l}$ that the limit protection controller can output to ensure that the limit protection controller can fulfill the role of over-limit protection;

S5. conducting a multi-variable controller test, and finely tuning each parameter to ensure the overall effect of the turbofan engine so as to enhance the adaptability of a multi-variable control system of the turbofan engine to the change of external environment.

* * * * *